Aug. 9, 1966 J. RABINOW 3,266,025

MAGNETIC RECORDING HEAD WITH SPINNING FOR READOUT

Filed Oct. 26, 1961

INVENTOR
Jacob Rabinow

BY Joseph A. Genovese & Max L. Libman

ATTORNEYS

United States Patent Office 3,266,025

Patented August 9, 1966

3,266,025

MAGNETIC RECORDING HEAD WITH SPINNING FOR READOUT

Jacob Rabinow, Takoma Park, Md., assignor, by mesne assignments, to Control Data Corporation, Minneapolis, Minn., a corporation of Minnesota Filed Oct. 26, 1961, Ser. No. 147,960
3 Claims. (Cl. 340—174.1)

This invention relates to magnetic transducing systems and particularly to systems which rely on relative motion between the record and the head for transducing the magnetic information of the record to electrical signals.

Most magnetic systems rely on the relative motion between the magnetic record and one or more heads for signal reproduction. Consequently, when the record is at (or near) rest, signal transducing is not possible with ordinary reading heads. There have been a number of solutions to this problem, for example as in the Williams Patent No. 2,424,295 where the head is rotated in a direction to sweep lengthwise of a magnetic tape while it is at rest or moving slowly. The Williams disclosure uses a standard head with mechanical motion imparted to the head. There have been other similar solutions using an auxiliary magnetic member located between the head and the tape.

A different solution to the problem is to use a Hall effect head which is a flux responsive device. Hall effect heads ordinarily require the play back signal to be a modulated carrier, so that there is an upper frequency limit on the pulse rate that can be reproduced. This limits the maximum speed of reproduction. (Magnetic Tape Instrumentation, McGraw-Hill Book Co., pp. 69 and 208.)

I prefer the mechanical-movement approach to the problem as opposed to the more or less special heads such as Hall effect heads. My invention solves the problem of reading a magnetic record, for instance a tape, disc or drum while it is at rest or moving very slowly, by rotating the magnetic head about an axis which passes through the gap of the head. It will be noted, especially in FIGURE 4 of the Williams patent, that the magnetic head of Williams rotates about an axis parallel to the surface of the tape and not through the gap. There are several advantages of my system. One is that if the bits of information (assuming a digital recording) are reasonably spaced, my head will read out a single bit with very little cross-talk from adjacent bits. In a system where the head rotates about an axis parallel to the gap, the gap must sweep a rather large arc (due to the required bulk of the head); and under ordinary circumstances, would cover considerable tape-length and would read out numerous bits of information from the tape.

In digital magnetic recording systems binary "1's" and "0's" are usually detected by determining whether the transduced signal rises and then falls (with respect to a given reference) or falls and then rises. This is the only information required by a computer or computer like equipment with which binary magnetic recording systems are generally used. My present invention is well suited for such digital systems. In principal, my invention distinguishes from normal techniques by coupling and decoupling the magnetic head with a magnetic bit by rotating the head in such a manner that the flux gap spins about an axis which is through the gap itself and approximately perpendicular to the surface of the record. During rotation, when the gap is parallel to the bit, (which may be thought of as a small bar magnet in the tape) the highest coupling is achieved. As the gap rotates from this position the magnetic coupling is reduced to zero or near zero when the gap is perpendicular and coplaner with the bit. Then the magnetic coupling increases, as the gap continues to rotate, to a maximum at which the gap is again parallel and coplaner with the bit. Such a system has an exceedingly important inherent advantage over a system as disclosed by Williams where the axis of rotation is parallel to the length dimension of the gap instead of perpendicular to it. From a physical standpoint the diameter of the rotating ferromagnetic head must be appreciable so that a rather long space on a magnetic tape would be swept out in a system such as shown in FIGURE 4 of Williams. With my system, however, the head may be made large, containing a considerable quantity of iron, and rotate without the gap sweeping a very large area of the tape. The reason is that only the gap portion of the head interrogates the record in my system.

Other objects and features of importance will become apparent in following the description of the illustrated form of the invention, wherein FIGURE 1 is a greatly enlarged diagrammatic top view showing a part of a magnetic record and a part of a conventional magnetic head juxtaposed with respect to a binary bit on the record.

FIGURE 1*a* is a view similar to FIGURE 1 showing the head as it is spinning with respect to the record.

FIGURE 1*b* is a figure similar to FIGURES 1*a* and 1 but it shows the head in a position 90° removed from FIGURE 1.

FIGURE 1*c* is a view similar to FIGURES 1–1*b* but showing the head rotated to a 180° position with respect to FIGURE 1.

To exemplify the invention, I have shown conventional magnetic tape 10 as the record having magnetic signals. But the record can just as well be a drum, disc or other form of magnetic record. Although my invention may be used in connection with various kinds of magnetic recording, I have selected digital-data recording because the problem of reading out a small part of the tape while the tape is at rest is quite acute in digital systems such as used for data processing, machine control purposes and others.

Figures 1B, 1C, 2, 3, 4, 5, 6:
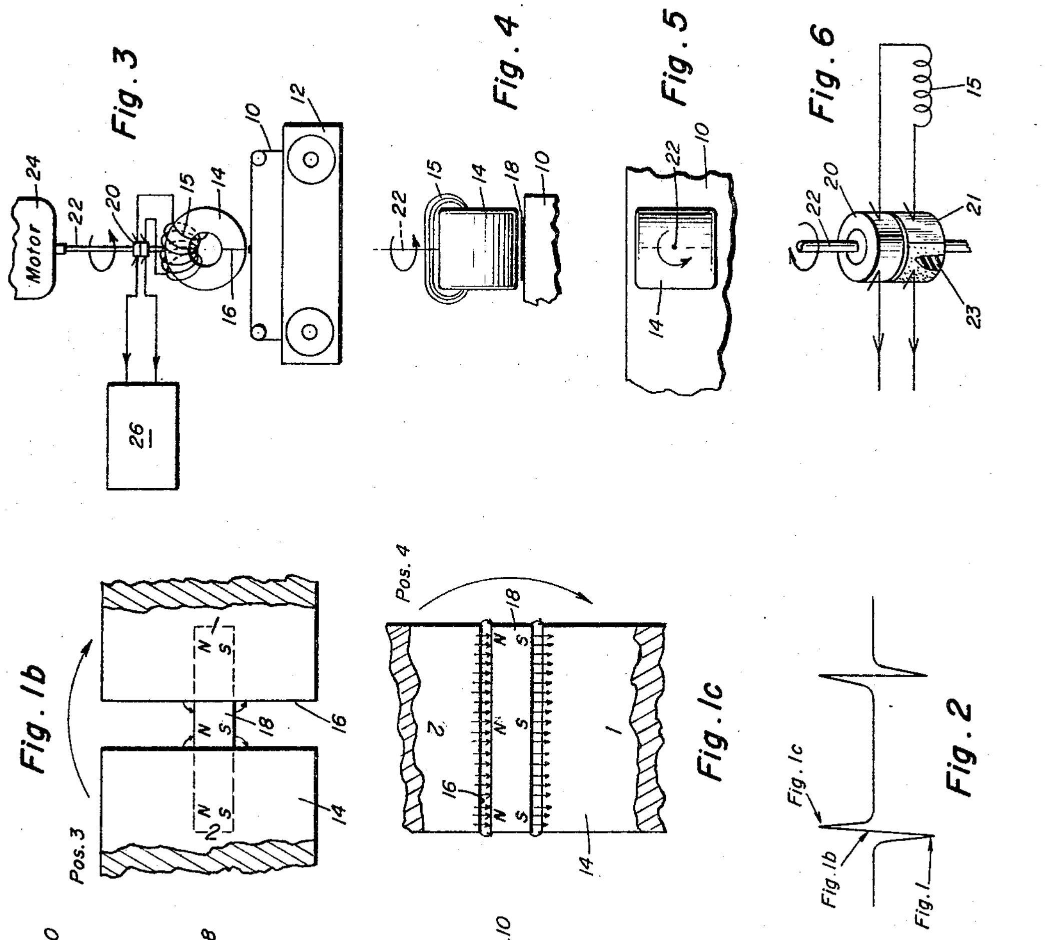
FIGURE 2 is a graph showing the output signal when the bit on the record in FIGURE 1 is read out by having the head rotate a full 360°.
FIGURE 3 is a diagrammatic view showing my transducing system, the head thereof shown enlarged.
FIGURE 4 is an end view showing the head and its relationship to a record.
FIGURE 5 is a top view of the head in FIGURE 4.
FIGURE 6 is a schematic view of a commutator.
Figures 1, 1A:
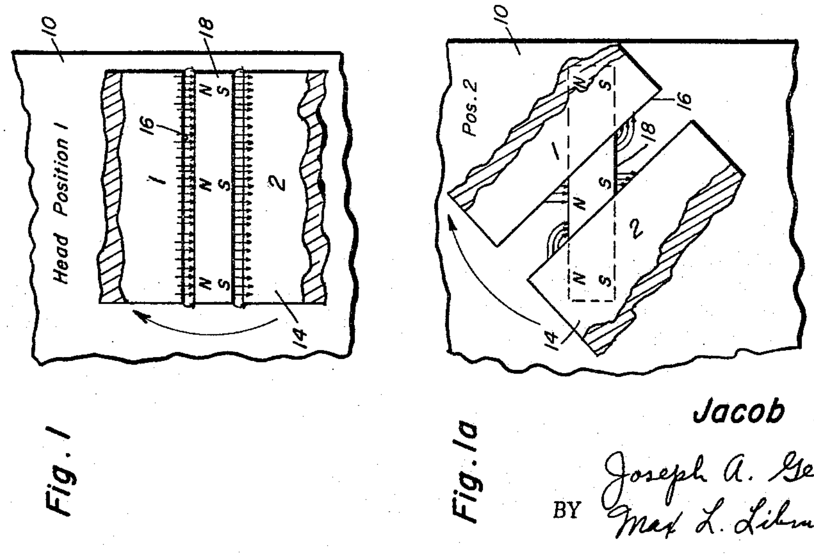

The procedure of my invention is quite simple. Tape transport 12 is conventional; therefore it has controls to both move and stop the tape. The read head 14 is diagrammatically shown as a soft iron body with a gap 16 (shown greatly enlarged in FIGS. 1–1*c*). The gap is either an air gap or a gap filled with non-magnetic material as is usual in the art. For ordinary readout, the head 14 is held fixed as shown in FIGURE 3 with the gap lengthwise of the digital bits 18 (FIGURE 1) of the tape. Each bit of information induces a signal in the head when there is relative movement between the tape and head.

When the tape is almost or actually at rest, there is no necessary relative movement between the tape and head to induce a signal in the head. In this mode, I rotate head 14 about an axis passing through gap 16. If the head is directly juxtaposed to a bit 18, a signal will be induced in the head as described more fully below in connection with FIGURES 1–1*c* and FIGURE 2. If the head 14 is not directly juxtaposed to the bit 18, there will be a signal induced in the head, but its strength will not be as large.

In most digital systems binary "ones" and "zeros" are represented by the polarity of the magnetic bits. In the usual case where the tape is moving with respect to the head, if the output signal rises and falls, the bit being investigated, is concluded to be a binary "one" (or vice versa). If the signal falls and then rises, the binary bit is deemed to be a binary "zero" (or vice versa). This same type of information is obtained from each binary bit by spinning the head about an axis passing through the gap. In explanation, attention is directed to FIGURES 1–1*c*. When the gap 16 is parallel to the bit 18 of tape 10, the head is flux-coupled with the bit. As the head begins to rotate (FIGURE 1*a*) the head begins to become decoupled. As the head rotates farther (FIGURE 1*b*) the magnetic coupling is completely or almost completely broken as shown by the small number of flux lines. As is well known, the signal (FIGURE 2) is induced by the change in the magnetic field induced in the head, and therefore, there will be an output from the coil 15 of the head during the decoupling and coupling of the coil with the binary bit. FIGURE 1*c* shows the head as it will appear with respect to bit 18 when the head has rotated 180°. In the position 1*c* the signal polarity is reversed. Thus, for 180° of rotation of the head (see FIGURE 2) the output signal will fall first, go to zero (FIGURE 1*b*) and rise to maximum (FIGURE 1*c*).

During the second 180° of rotation the signal transduced from the tape will be reversed, i.e., it will rise first and then fall and again rise to zero. Thus, ostensibly the binary bit 18 will yield an output signal which first calls the bit a binary "one" and then calls the same bit a binary "zero." This problem is overcome by a conventional commutator 20 mounted on shaft 22 of motor 24 which rotates the head. By using a commutator, a number of possible solutions to the problem suggest themselves depending on the design of the commutator. For instance, the commutator may be such that the second 180° of rotation of the head is always ignored. In such a case, the commutator will have a part made of a conductive section 21 and a non-conductive section 23 as shown in FIGURE 6. I can also use a commutator to invert the signal obtained from every second 180° rotation. Thus, if the first signal information (FIGURE 2) falls and then rises, so will the second and vice versa. The commutator 20 shown in FIGURE 6 is given by way of example only to show a suitable means to serve the purpose. The output lines are operatively connected with the commutator 20 and conventional utilization circuits 26 including an amplifier and other circuitry whose specific nature forms no part of my present invention. The same holds true for the control circuit (not shown) of motor 24 and the nature of a transport 12.

There is an important advantage in using a commutator with my spinning head, especially where the packing density of the tape is high. The commutator can be designed to conduct a signal during a small fraction of each revolution of the head, e.g. only five degrees by making section 21 only five degrees wide. Further, the five degrees of conduction can be when the head gap is just crossing parallelism with the bit. Thus only the strongest part of the signal is conducted, and the question of cross talk in reading out a bit is practically eliminated.

It is understood that the illustrated form of the invention is given by way of example only. I have shown only a single head, and it is obvious that the invention applie equally to multi-section heads for multi-channel records Also, my head 14 need not be the main readout head. I may be used in combination with conventional head where my system shown in FIGURE 3 would investigate only a block-length channel for computer or computer like equipment use or a special channel reserved fo positional (or other) data on the record. There are many other possible uses of my system.

I claim:

1. In a magnetic record playback system which includes a magnetic record having a plurality of adjacent binary bits recorded thereon, a transducing head having a gap located adjacent to the record, means for rotating said head about an axis passing through said gap and through one of said bits when said record is at rest to successively magnetically couple and decouple the head with one of said binary bits and thereby induce a signal in said head corresponding to the polarity of the recorded binary bit, and means for conducting said induced signal from said head during only portions of the revolutions of said head to thereby eliminate cross talk originating from bits adjacent to the bit confronting said gap.

2. The system of claim 1 wherein said signal conducting means are conductive substantially only when said magnetic coupling is maximum.

3. In a magnetic record transducing system for a record having discrete binary bits recorded thereon, means to move said record at a predetermined design speed, a magnetic transducer including a magnetic head provided with a gap whose longer dimension is parallel to the length dimensions of the recorded bits as they are moved past said head, so that as a bit moves past said gap a signal is induced in said head, which signal rises above and falls below a reference owing to said bit becoming magnetically coupled and decoupled with said head, means for operating said transducer in such a manner that the record may be at rest while said bit is being read, said transducer operating means including means to rotate said head about an axis substantially perpendicular to the part of the record containing said bit and through said gap in a direction substantially normal to its said longer dimension so that the portions of said gap on both sides of said axis are simultaneously magnetically coupled and decoupled with said bit during rotation of said head, to thereby induce a signal in said head which rises above and falls below said reference while the record is at rest, and commutating means to pass the last-mentioned signal during only the fraction of a revolution of said head at which said head is substantially parallel to the bit.

References Cited by the Examiner

UNITED STATES PATENTS

| | | | |
|---|---|---|---|
| 2,707,212 | 4/1955 | Hickey | 340—174.1 |
| 2,772,328 | 11/1956 | Lyon | 179—100.2 |
| 2,832,840 | 4/1958 | Morin. | |
| 2,914,746 | 11/1959 | James | 340—149 |
| 3,012,233 | 12/1961 | Greanias et al. | 179—100.2 |
| 3,086,089 | 4/1963 | Lyon. | |

BERNARD KONICK, *Primary Examiner.*

IRVING SRAGOW, *Examiner.*

F. C. WEISS, M. S. GITTES, *Assistant Examiners.*